United States Patent [19]

Southwick et al.

[11] Patent Number: 5,776,998
[45] Date of Patent: Jul. 7, 1998

[54] NON-AQUEOUS SOLVENT FREE PROCESS FOR MAKING UV CURABLE ADHESIVES AND SEALANTS FROM EPOXIDIZED MONOHYDROXYLATED DIENE POLYMERS

[75] Inventors: Jeffrey George Southwick, Waterloo, Belgium; Kathleen Suzanne Kübler; James Robert Erickson, both of Katy, Tex.

[73] Assignee: Shell Oil Company, Houston, Tex.

[21] Appl. No.: 638,476

[22] Filed: Apr. 26, 1996

Related U.S. Application Data

[60] Provisional application No. 60/000,269 Jun. 16, 1995.
[51] Int. Cl.$^6$ ............ C09J 163/08; C08L 63/08; C08F 2/50
[52] U.S. Cl. ............ 522/111; 522/112; 522/109; 522/110; 522/3; 522/31; 525/98; 525/314; 525/332.1
[58] Field of Search ............ 522/3, 111, 110, 522/109, 98, 314, 332.1

[56] References Cited

U.S. PATENT DOCUMENTS

| | | | |
|---|---|---|---|
| 4,960,838 | 10/1990 | Gergen et al. | 525/426 |
| 5,039,743 | 8/1991 | Machado | 525/92 |
| 5,043,389 | 8/1991 | Gergen et al. | 525/179 |
| 5,068,289 | 11/1991 | George et al. | 525/179 |
| 5,084,518 | 1/1992 | George et al. | 525/184 |
| 5,229,464 | 7/1993 | Erickson et al. | 525/314 |
| 5,370,968 | 12/1994 | Goss et al. | 430/271 |

FOREIGN PATENT DOCUMENTS

| | | | |
|---|---|---|---|
| 84/01951 | 5/1984 | WIPO | 522/3 |

OTHER PUBLICATIONS

"Liquid Reactive Polymers for Radiation Curable High Performance PSA's" by J.R. Erickson, E.M. Zimmermann, J.G. Southwick, and K. S. Kübler, 1995 Hot Melt Symposium.

Primary Examiner—Susan W. Berman
Attorney, Agent, or Firm—Donald F. Haas

[57] ABSTRACT

The invention herein is a non-aqueous solvent free process for producing UV curable adhesive and sealant compositions comprising a tackifying resin and a monohydroxylated epoxidized polydiene polymer which is comprised of at least two polymerizable ethnically unsaturated hydrocarbon monomers wherein at least one is a diene monomer which yields unsaturation suitable for epoxidation and wherein the polymer contains from 0.1 to 7.0 milliequivalents of epoxy per gram of polymer. The process involves mixing the components with an insoluble photoinitiator under conditions of high shear and/or cavitation. The invention also relates to a film of 5 mils to one inch thick which is formed from the composition made according to the process above.

9 Claims, No Drawings

NON-AQUEOUS SOLVENT FREE PROCESS FOR MAKING UV CURABLE ADHESIVES AND SEALANTS FROM EPOXIDIZED MONOHYDROXYLATED DIENE POLYMERS

This Application claims the benefit of U.S. Provisional application Ser. No. 60/00,269, filed Jun. 16, 1995.

FIELD OF THE INVENTION

This invention relates to a new process for making adhesives and sealants made from monohydroxylated diene polymers. More specifically, the invention relates to a non-aqueous solvent free process for making UV curable adhesives and sealants from epoxidized monohydroxylated polydiene polymers. This invention also relates to very thick radiation curable films.

BACKGROUND OF THE INVENTION

The use of novel epoxidized monohydroxylated polydienes in UV curable adhesive and sealants compositions is described in copending commonly assigned U.S. patent application Ser. No. 08/320,804, filed Oct. 11, 1994. The polymers are combined with other ingredients such as a tackifying resin to make them suitable for adhesive and sealant products. A photoinitiator is included in the combination to promote the UV curing (crosslinking) of the composition. As described in the examples of the aforesaid patent application, the components were blended in a non-aqueous solvent, tetrahydrofuran (THF), and then adhesive films were cast from the solution. THF was used because the particular commercial photoinitiator (mixed triaryl sulfonium hexafluoroantimonate salts in propylene carbonate) selected was not otherwise soluble in the adhesive formulation. The photoinitiator dissolves in THF. After the adhesives were solvent cast, the THF was evaporated to leave the photoinitiator adequately dispersed in the remaining non-aqueous solvent free adhesive film to initiate effective UV curing upon exposure to UV light.

For many applications, the use of non-aqueous solvents is undesirable because of environmental hazards and the cost of non-aqueous solvent removal and the non-aqueous solvent itself. The invention described herein provides a non-aqueous solvent free process for dispersing a photoinitiator that is insoluble in a polymer/formulation so that an effectively cured adhesive or sealant is produced without these problems. Also, this process allows very thick films to be cured by exposure to radiation, films up to one inch and more.

SUMMARY OF THE INVENTION

This invention is a process for making UV curable adhesives, sealants, coatings, ink, flexible printing plates, laminating adhesives, fibers, gaskets, and related compositions, films, and thin parts, wherein an epoxidized monohydroxylated polydiene polymer comprised of at least two polymerizable ethylenically unsaturated hydrocarbon monomers wherein at least one is a diene monomer which yields unsaturation suitable for epoxidation is used as the binder for the composition. The preferred epoxidized monohydroxylated polymers are block copolymers of at least two conjugated dienes, preferably isoprene and butadiene, and optionally, a vinyl aromatic hydrocarbon wherein a hydroxyl group is attached at one end of the polymer molecule. These polymers may be hydrogenated or unhydrogenated.

The process involves mixing the above polymer and the other formulating ingredients together with an insoluble photoinitiator which preferably is selected from the group consisting of triaryl sulfonium salts. The mixture is then subjected to cavitation or high shear conditions in a sonicator at a power density of at least 2 watts per milliliter or in a high shear rotational mixer, like a Silverson, the shear rate must be at least about 38,000 s-1. One of the preferred embodiments of this invention is that thick films, from 5 mils up to 1 inch or more, can be cured when they are prepared using the process of this invention.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, napthalides, biphenyls or anthracenyl derivatives. The monohydroxylated polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Specific processes for making these polymers are described in detail in copending, commonly assigned application Ser. No. 08/320,807, "Monohydroxylated Diene Polymers and Epoxidized Derivatives Thereof", filed Oct. 11, 1994, which is herein incorporated by reference.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The most preferred monohydroxylated polydiene polymer of the present invention has the structural formula $$(HO)_x-A-S_z-B-(OH)_y \qquad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers may be epoxidized such that they contain from 0.1 to 7.0 milliequivalents (meq) of epoxy per gram of polymer.

Diblocks falling within the above description are preferred. The overall molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

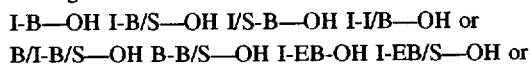

where EB is hydrogenated butadiene, -EB/S—OH means that the hydroxyl source is attached to a styrene mer, and -S/EB—OH signifies that the hydroxyl source is attached to a hydrogenated butadiene mer. This latter case, -S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity when cured. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

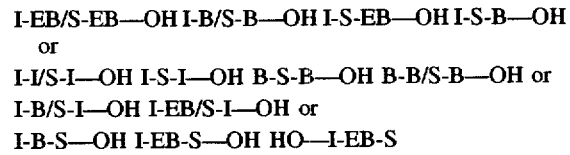

The latter group of polymers specified in the last line above wherein the styrene block is external are represented by the formula

where A, B, S, x, and y are as described above. These polymers and the other triblocks shown above are particularly advantageous for introducing blocks of epoxy functionality into the monohydroxylated polymers at multiple sites.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. These and other methods are described in more detail in U.S. Pat. 5,229,464 and 5,247,026 which are herein incorporated by reference. The amount of epoxidation of these polydiene polymers ranges from about 0.1 to about 7 milliequivalents of epoxide per gram of polymer. Lower levels are desirable to avoid overcure. Above 7 meq/g, the rigidity, crosslink density, cost, difficulty of manufacture, and polarity of the polymer (so as to not accept certain monohydroxy diene polymer) are too high to provide benefit. The preferred amount of epoxidation is about 0.5 to about 5 meq/g and the most preferred amount of epoxidation is about 1.0 to 3 meq/g. The most preferred amount best balances rate of cure against overcure and better maintains compatibility with a variety of formulating ingredients commonly used with polydiene based adhesives.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinylbenzene gels or silica gels are commonly used and are excellent materials. Tetrahydrofuran is an excellent non-aqueous solvent for polymers of the type described herein. A refractive index detector may be used.

If desired, these block copolymers can be partially hydrogenated. Hydrogenation may be effected selectively as disclosed in U.S. Pat. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. 5,039,755 which is also incorporated by reference. The polymers may have different diene blocks and these diene blocks may be selectively hydrogenated as described in U.S. Pat. 5,229,464 which is also herein incorporated by reference. Partially unsaturated hydroxylated polymers are useful for further functionalization to make the epoxidized polymers of this invention. The partial unsaturation preferably is such that 0.1 to 7 meq of aliphatic double bonds suitable for epoxidation remain on the polymer. If epoxidation is done before hydrogenation, then it is preferred that all remaining aliphatic double bonds be hydrogenated.

The binders of this invention may be cured by cationic means using acid catalysts but are preferably cured by means of ultraviolet or electron beam radiation. Radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. 5,229,464 which is herein incorporated by reference.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, dialkyl-4-hydroxylphenylsulfonium salts. The anions in these salts generally possess low nucleophilic character and include SbF6-, BF4-, PF6-, AsF6-, and B(C6F5)4- (tetrakis (pentafluoro-phenyl)borate). Specific examples include (4-octyloxyphenyl)-phenyl-iodonium hexafluoroantimonate, UVI-6990 (from Union Carbide), FX-512 (3M Company), and SILCOLEASE UV200CATA photoinitiators (Rhone-Poulenc Chemie). Bis (dodecylphenyl)-iodonium hexafluoroantimonate, UV 9310 (GE), and triaryl sulfonium hexafluoroantirnonate, UVI-6974 (Union Carbide), are especially effective. The onium salts can be used alone or in conjunction with a photosensitizer to respond to long wavelength UV and visible light. Examples of photosensitizers include thioxanthone, anthracene, perylene, phenothiazione, 1,2-benzathracene coronene, pyrene and tetracene. Generally, the photoinitiator and photosensitizer are chosen to be compatible with the polymer/formulation being crosslinked and the light source available. When the photoinitiator is insoluble in the neat polymer or a 100% solids formulation, it should be adequately dispersed into the polymer/formulation.

As described in the examples of copending, commonly assigned U.S. patent application Ser. No. 08/320,804, filed October 11, 1994, a insoluble photoinitiator can be dispersed in a non-aqueous solvent along with the polymer and tackifying resin in order to provide a composition which is radiation curable. The present process accomplishes this without a non-aqueous solvent. The polymer, resin, and photoinitiator are mixed together and sonicated at a power density of at least 2, preferably 4 watts per milliliter (the power density is the measure of the mixing ability of a sonicator and is calculated by dividing the wattage of the sonicator by the volume of the sample) or processed in a high shear mixer wherein the level of shear is at least 38,000 s-1. Examples of such processing equipment include Branson sonifiers and Silverson high shear mixers. In a commercial scale operation, continuous sonication would be preferred. This could be done by using the horn in a flow through cell.

It is highly advantageous to include in the composition low molecular weight, non-epoxidized hydroxylated polymers, especially the non-epoxidized monohydroxylated polydiene polymers and dihydroxylated polydiene polymers described in U.S. patent application Ser. No. 08/320,803, filed Oct. 11, 1994.

Radiation induced cationic curing may also be done in combination with free radical curing. Free radical curing can be further enhanced by the addition of additional free radical photoinitiators and photosensitizers.

The materials of the process of the present invention are useful in pressure sensitive adhesives and sealants (including packaging adhesives, contact adhesives, laminating adhesives, weatherable tapes, transfer and mounting tapes, structural adhesives, automotive adhesives, and assembly adhesives), and coatings, inks, labels, and printing plates. It may be necessary for a formulator to combine a variety of ingredients together with the polymers of the present invention in order to obtain products having the proper combination of properties (such as adhesion, cohesion, durability, low cost, etc.) for particular applications. In most of these applications, suitable formulations would also contain various combinations of resins, plasticizers, fillers, non-aqueous solvents, stabilizers and other ingredients such as asphalt.

It is common practice to add an adhesion promoting or tackifying resin that is compatible with the polymer, generally from 20 to 400 parts per hundred parts of polymer. A common tackifying resin is a diene-olefin copolymer of piperylene and 2-methyl-2-butene having a softening point of about 95° C. This resin is available commercially under the tradename WINGTACK® 95 and is prepared by the cationic polymerization of 60% piperylene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumaroneindene resins, polystyrene resins, vinyl toluene-alpha methylstyrene copolymers and polyindene resins.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up.

Fillers and pigment will be selected to give appropriate durability and color. Since sealants are applied in fairly thick layers, non-aqueous solvent content is as low as possible to minimize 10 shrinkage.

EXAMPLES

In the examples several adhesive tests are used to demonstrate the properties of test formulations using the improved binders of this invention. The degree of covalent cure obtained for each of the adhesive samples was measured by use of a polymer gel content test developed by J. R. Erickson for radiation curing adhesives, and first described in the article "Experimental Thermoplastic Rubbers for Enhanced Radiation Crosslinking of Hot Melt PSA's", TAPPI 1985 Hot Melt Symposium Proceedings, Jun. 1985. The method as practiced for the present examples is essentially identical to the method as published, but for a few minor improvements and corrections to the method as first published. 180° Peel from polished steel was determined using Pressure Sensitive Tape Council Method No. 1, and a peel rate of 12 inches per minute. Large values indicate high strength when peeling a test tape from the substrate.

The polymer I used in examples 1 and 2 is an epoxidized linear monohydroxy diene polymer of 6,000 molecular weight with the structure I-EB—OH (2000–4000 block MW) and 0.17 meq/g hydroxyl and 1.5 meq/g epoxy. The unepoxidized mono-ol polymer, Polymer 2, used herein is a linear monohydroxy diene polymer with a molecular weight of 3,000 and the structure EB—OH containing 0.33 meq/g hydroxyl. The insoluble photoinitiator used is UVI 6974, a triaryl sulfonium salt cationic photoinitiator supplied by Union Carbide. The tackifier was REGALREZ® 1085, a hydrogenated tackifying resin made by Hercules.

Example 1

Previous adhesives comprised of the polymer, mono-ol, REGALREZ 1085, and UVI 6974 would not UV cure unless mixed together with THF. This lack of cure was evident by lack of cohesion of the adhesive. Essentially the adhesive remained a viscous liquid (goo) and when one tried a finger tack test, adhesive would split and transfer to the finger. This performance is totally unacceptable. Our first attempt at forming UV cured adhesives by sonifying the mixture of photoinitiator and adhesive at 125° C. in a beaker gave a well cured film showing no adhesive transfer in finger tack tests. Furthermore, the adhesive gave a 180° peel to steel value of 4.5 pli with no adhesive transfer. The adhesive was clearly well-cured in contrast to our previous experience without sonication.

Example 2

A series of tests were performed to determine if the sonifier is unique in its ability to effectively disperse photoinitiator into these hot melt systems. A standard formulation was prepared and processed by five different mixers:

1) A Branson 450 Sonifier, delivering a nominal 400 watts of power, and 20 kHz electrical energy; a ½" diameter sonic horn was used to disperse the photoinitiator in a sample formulation of 20 milliliters for about 30 seconds. The actual power density used was about 240 watts/20 ml or about 12 watts per milliliter. (240 watts is obtained from the Branson's 450 Sonifier Power Output Chart for a output [dial] control setting of 10 and an output meter reading of about 65.)

2) An electric mixer equipped with a glass rod and a paddle blade; maximum RPM approximately 150. The photoinitiator was dispersed into 50 grams of formulation. This took about one minute of agitation.

3) A Microfluidics emulsifier Model M-100F operated at about 10,000 psi.

4) An electric-motor Silverson high-shear mixer capable of delivering 13,000 RPM (the maximum was used).

5) A pneumatic-motor Silverson high-shear mixer capable of delivering 5000 RPM (the maximum was used). 5000 RPM produces a shear rate of about 38,000 s-1

In each case, identical samples were prepared and heated to 125° C. In the melted state, the solution viscosity is relatively low and the photoinitiator can be seen as a distinct phase (droplets of fluid) with the unaided eye. Attempts were made to disperse the photoinitiator (at 125 ° C.) throughout the system, using the five mixers described above. When the dispersion process was successful, a fine dispersion having droplet size less than 10 micron diameter was seen by microscopy at 125×, and the films were cured as measured by the gel content (the percentage of the polymer that is covalently attached to the three dimensional gel network).

A summary of results is listed below:

1) The Branson 450 Sonifier produced a homogenous, stable sample curing to a gel content of 89%.
2) The electric mixer w/paddle blade was not effective in stirring the solution or dispersing the photoinitiator; gel content not measured.
3) The Microfluidics emulsifier could not process material and plugged; gel content not measured.
4) The electric-motor Silverson produced a homogenous, stable samples curing to a gel content of 61%.
5) The pneumatic-motor Silverson produced a homogeneous, stable sample curing to a gel content of 61%.

Based on this data, it appears that the Branson 450 Sonifier produces the best dispersion of photoinitiator in this hot melt system. However, the Silverson mixers also work. These mixers produced adhesive systems that were well cured with UV radiation, and these adhesives did not cohesively fail in 180° peel testing.

Example 3

Polymers 3, 4, 5 are used in example 3. Polymer 3 is an epoxidized linear monohydroxy diene polymer with a number average molecular weight of 5500. The polymer is a diblock polymer where the first block consists of hydrogenated, epoxidized polyisoprene and the second block is hydrogenated polybutadiene. The second block has a terminal, primary hydroxyl group. The number average molecular weight ratio between the second block and the first block was 2/1. The polymer has 1.4 meq of epoxide functionality per gram and 0.17 meq of hydroxyl groups per gram. Polymer 4 is a linear monohydroxy diene polymer with a number average molecular weight of 3635 and 0.24 meq/g of hydroxyl functionality. Polymer 4 has a terminal, primary hydroxyl group. Polymer 5 is similar to Polymer 4 except it has a number average molecular weight of 4260 and 0.23 meq of hydroxyl functionality.

Adhesive preparation: Five percent photoinitiator master batches were prepared with each of the mono-ol polymers as shown in Table 1.

TABLE 1

| Photoinitiator Master Batches | | |
|---|---|---|
| Photoinitiator Master Batch | MB-1 (w %) | MB-2 (w %) |
| Polymer 4 | 95 | 0 |
| Polymer 5 | 0 | 95 |
| CYRACURE ® UVI-6974 | 5 | 5 |

The master batch procedure was to weigh the ingredients (50 g) into 2 oz bottles and heat for 30 minutes in forced-draft oven set at 135° C., and sonicate for two one minute periods with cooling time between. A Branson 450 Sonicator equipped with a ½ inch tapped horn was used. The sonifier was operated in the continuous mode. The output control was set at 10 and the power output meter reading was about 70%, giving a power density of about 4.8 watts per ml of adhesive. For MB-1, sonication did not mix the photoinitiator into the mono-ol during the first sonication period. It sat on the bottom of the bottle and it had to be hand mixed prior to the second sonication period. Consequently, MB-2 was hand mixed before any sonication. After sonication, both master batches appeared well dispersed to the eye. They were allowed to cool to room temperature before being incorporated into pressure sensitive adhesive (PSA) formulations C and D.

PSA's were prepared according to the recipes given in Table 2. The batch size was 50 grams.

TABLE 2

| PSA | PSA Formulations | | | |
|---|---|---|---|---|
| | A (wt. %) | B (wt. %) | C (wt. %) | D (wt. %) |
| Polymer 3 | 24.3 | 24.3 | 24.3 | 24.3 |
| Polymer 4 | 25.3 | 0 | 15.8 | 0 |
| Polymer 5 | 0 | 25.3 | 0 | 15.8 |
| MB-1 | 0 | 0 | 10.0 | 0 |
| MB-2 | 0 | 0 | 0 | 10.0 |
| REGALREZ® 1085 | 49.7 | 49.7 | 49.7 | 49.7 |
| CYRACURE® UVI-6974 | 0.50 | 0.50 | 0 | 0 |
| IRGANOX® 1010 | 0.15 | 0.15 | 0.15 | 0.15 |

The PSA preparation procedure was to add all the ingredients for 50 gram batches, except for MB-1 and MB-2, to 2 oz bottles and heat each for one hour at 135° C. in the forced-draft oven. PSA formulations A and B were removed from the oven and immediately sonicated for one minute using the continuous mode of operation on the Branson 450. The output setting was 10 and the power output meter reading was about 60%, providing a power density of about 4.3 watts per ml of adhesive. PSA's C and D were removed from the oven and mixed for 30 minutes with a small electrically driven paddle mixer while holding the temperature at 135° C. using a hot plate. The required portion of the corresponding photoinitiator master batch was then added while still mixing. The final formulation was paddle mixed for an additional 30 minutes while holding the temperature at 121° C.

UV cure conditions: Each of the hot PSA's was immediately cast onto one mil polyester film to give approximately a 1.5 mil adhesive thickness and UV cured using a Fusion Lab Coater equipped with one H bulb. Just before this cure, the test films were placed into a 121° C. oven for 2 minutes, removed, and immediately irradiated. The conveyor web speed (43 meters per minute) was set to yield a dose of 125 mJ/cm, as measured on a Lightbug radiometer. All four of the samples immediately cured to the touch. PSA testing was started after the irradiated test films had aged at room temperature for 24 hours. Films from adhesives A and B were less hazy than those from C and D, both before and after cure.

Elapsed time from sample preparation, irradiation, and laminating to a test substrate are secondary variables that were tracked, as photoinitiator dispersion stability, degree of cure, and wetting can be expected to be partially dependent upon elapsed time. A coding system is employed in this report to convey the timing information. Example: (0-1-1) means 0 days elapsed between the formulation preparation and casting/curing, testing started 1 day after curing, and a 1 hour contact time was allowed for the PSA to wet the test substrate before the test value was determined.

Extra 180° peels were done against a typical automotive TPO substrate. The TPO was Himont Republic Inc. ETA 3081. ETA 3081 is a flexible, low modulus thermoplastic olefin, suitable for exterior use. It was supplied by ACT Laboratories. The TPO panels were washed with methyl ethyl ketone and allowed to dry prior to use.

Photoinitiator Dispersion Stability Observed by Microscopy: Optical microscopy was begun on the samples and the master batches immediately after preparation. Observation was done in bright field at 500 magnification. The observations are summarized in Table 3.

TABLE 3

| Droplet Size of the Photointiator Dispersion | | | | | | |
|---|---|---|---|---|---|---|
| Formulation | A | B | C | D | MB-1 | MB-2 |
| Immediately after preparation | too small to see | too small to see | medium droplets, evenly distributed | medium droplets, distributed in pockets | small droplets, evenly distributed | small droplets, evenly distributed |
| Microscope slide with sample aged for 2 minutes at 121° C. | no change from above | no change from above | — | — | — | — |
| Aged for 1 hour at 121° C. | very small droplets, some medium | very small droplets, a few medium | — | — | — | — |
| Aged for 16 hours at 121° C. | very small droplets, very few larger ones | very small, uniform sized droplets | medium droplets, evenly dispersed | very small droplets, evenly dispersed | — | — |

PSA Test Results: Table 4 gives the mean response values obtained for each of the tests. Film thickness measurements were not made. The gel test samples varied appreciably in mass per unit area, which may indicate that the film thicknesses were not all at the intended 1.5 mils. If the gel samples were cut from the uniform portions of the test films, then the mass per area values indicate that the adhesive film thickness varied from about 1.3 to 2.9 mils, assuming a 0.93 g/cm$^2$ adhesive density.

99% confidence limits for each mean can be calculated from the error, $S_r$, associated with single observations within each individual PSA test method, the number of replicates used to determine the mean, and the appropriate Student t value. These limits are provided in the last column of Table 4. It must be realized that the error used ($S_r$) was only that associated with running the particular tests, and did not include error, $S_p$, associated with repeating the preparation of the formulation and recasting. Error associated with film thickness differences is part of $S_p$. Since the total error, $(S_r^2+S_p^2)^{1/2}$, is larger than $S_r$, it is obvious from Table 5 that there is no evidence for B, C, or D being different than A in a number of PSA properties. Some very small differences cannot be ruled out where the $S_r$ based 99% confidence limits are exceeded, such as for rolling ball tack (D), peels (B, C, and D), and SAFT (C).

UVI-6974 and CD-1010 are only 50% active. CD-1010 (from Sartomer) contains the same active ingredient and amount of propylene carbonate carrier solvent as the UVI-6974. REGALITE 91 tackifying resin, another hydrogenated tackifying resin from Hercules, was substituted for the REGALREZ 1085.

Prior to sonication, all of the ingredients for each batch were weighed into 2 ounce glass bottles, preheated to 135°

TABLE 4

| PSA | PSA Test Results | | | | Number of Replicates | 99% Confidence limits on means |
|---|---|---|---|---|---|---|
| | A (mean) | B (mean) | C (mean) | D (mean) | | |
| Rolling ball Tack (0-1-0), cm | 3.5 | 4.6 | 4.5 | 9.5** | 4 | ±2.1 |
| Polyken Probe Tack (0-1-0), Kg | 0.48 | 0.76 | 0.63 | 0.37 | 4 | ±0.32 for A, C, D, and ±0.29 for B |
| TLMI loop Tack (0-1-0), oz/in | 37 | 51 | 52 | 29 | 2 | ±16 |
| 180° Peel from steel (0-1-1), pli | 2.50 | 2.55 | 2.60 | 2.95** | 2 | ±0.23 |
| 180° Peel from steel (0-1-24), pli | 2.80 | 3.05** | 3.35** | 3.70** | 2 | ±0.23 |
| 180° Peel from steel (0-6-1), pli | 2.45 | 2.85** | 3.05** | 3.45** | 2 | ±0.23 |
| 180° Peel from steel (6-1-1), pli | 3.45 | 3.35 | 2.75** | 3.75** | 2 | ±0.23 |
| 180° Peel from olefin (6-1-1), pli | 3.00 | 2.70 | 2.70 | 3.50** | 2 | ±0.40 |
| 180° Peel from olefin (6-1-24), pli | 3.00 | 2.50** | 2.45** | 3.35 | 2 | ±0.40 |
| Polymer gel content (6-1-0), % | 87 | 89 | 87 | 70 | 1 | no replication done |
| Sample weight used for gel, g/4 in² | 0.0824 | 0.1344 | 0.1717 | 0.1403 | | |
| Polymer gel content (0-6-4), % | 78 | 84 | 85 | 87 | 1 | no replication done |
| Sample weight used for gel, g4/in² | 0.1782 | 0.1331 | 0.0936 | 0.0983 | | |
| Shear adhesion failure temperature (SAFT) to Mylar, (6-1-0) 1 in² * 500 g, °C. | >167 a | 144 a | 55 a** | 161 a | 2 | ±47 |
| 95° C. Holding power to Mylar (6-1-.1) 1 in² * 500 g, hour | >92 | >92 | >92 | >92 | 2 | ±0 |
| 23° C. Holding power to steel (6-1-0), 1 in² * 2 Kg, hour | >672 | >672 | >672 | >672 | 2 | ±0 | a means adhesive failure.
**These values are possibly different than the corresponding A values.

The initial microscopy results indicated that the photoinitiator dispersion using the master batch approach (C and D) was not as good as the dispersion obtained by sonicating the entire batch. However, the masterbatch dispersions improved upon heat aging. Regardless, little difference was found between PSA's A, B, C, and D in PSA properties. Therefore, the approach of dispersing the photoinitiator into the mono-ol polymer component via sonication to make a concentrated masterbatch that can subsequently be easily blended into a formulation by means of simple mixing equipment is a very viable alternative to having to use sonication equipment to disperse the photoinitiator into the entire batch. It should be expected that the same result could have been obtained by using the epoxidized monohydroxylated polymer in place of the mono-ol polymer when making the photoinitiator masterbatch. The results also say that Polymers 4 and 5 are equivalent in their performance in combination with Polymer 3. The resulting adhesives are excellent.

Example 4

Forty gram batches of 4 adhesive formulations were prepared using the sonication method. See Table 5 for the formulations. Polymer 6 is similar to Polymer 3 but has a number average molecular weight of 6070, 0.17 meq of hydroxyl groups per gram of polymer, and 1.6 meq of epoxy per gram of polymer. All photoinitiator additions, shown in Table 5, are expressed in terms of the active ingredients.

C. in an oven, and then hand mixed. Each sample was sonicated in pulsed mode for two one minute periods at an output control setting of 10 and an output meter reading of about 60, corresponding to a power density of about 5.3 watts per ml. During the first minute of sonication, a 70% duty cycle (pulsed mode of operation where power is on for 0.7 second and off for 0.3 second) was used and during the second minute it was a 50% duty cycle (0.5 second on and 0.5 second off). At the end of the sonication, the peak temperature of each sample was measured. The formulations were immediately examined by optical microscopy using phase contrast a 1260 magnification.

Films were cast at four film thicknesses, 4–5 mils, 7–9 mils, 11–12 mils, and 16–18 mils onto one mil polyester using a 93° C. application temperature. UV curing was carried out at three film temperatures, 23° C., 58° C., and 93° C. The films were preheated for 2 minutes in a 58° C. or 93° C. oven. UV curing was carried out using a Fussion Lab Processor and On "H" bulb. The dose was 125 mJ/cm2 as measured with a Lightbug radiometer. The films were aged at room temperature for 25 hours in the dark before testing for cure, 180° peel from steel, and gel content. The peel test used a one hour contact time prior to pulling.

TABLE 5

PSA Formulations using Different Photoinitiators at Two Levels

| Ingredient | A (wt. %) | B (wt. %) | C (wt. %) | D (wt. %) |
|---|---|---|---|---|
| Polymer 6 | 24.4 | 24.4 | 24.4 | 24.4 |
| Polymer 5 | 25.5 | 25.4 | 25.5 | 25.4 |
| REGALITE R-91 | 49.9 | 49.8 | 49.9 | 49.8 |
| UVI-6974 (active) | 0.10 | 0.25 | 0 | 0 |
| CD-1010 (active) | 0 | 0 | 0.10 | 0.25 |
| IRGANOX 1010 | 0.15 | 0.15 | 0.15 | 0.15 |

TABLE 6

Maximum Sonication Temperature and Microscopy

| Adhesive | A | B | C | D |
|---|---|---|---|---|
| Maximum Temperature, °C. | 150 | 154 | 173 | 155 |
| Microcospy | dispersed particles, similar to previous dispersions at about 0.4 micron | more dispersed particles than A | dispersed particles, like A | More dispersed particles than C, like B |

The sonication method of using less than 100% duty cycle for 2 minutes was adequate but inferior to the standard method of using 100% for one minute. Using pulsed power caused some spitting out of material from the bottles. Also, if the duty cycle during the first minute was less than 70% there was inadequate circulation in the samples.

Sonication raised the sample temperature above the 135° C. starting point. The temperature of each sample was measured immediately after completion of the 2 minutes of sonication. These maximum temperatures are given in Table 6.

Approximately 5 minutes after irradiation the samples were probed with a wood splint. For some of the samples, the entire film remained fluid, indicating no cure. With others, only the surface of the film was solid, while for others the sample was a solid pressure sensitive adhesive (PSA) throughout, indicating surface and through cure, respectively. After the films had aged overnight, many of the films that initially showed no cure or only surface cure did cure through. Those films that were cured through overnight (20 hours) were tested for peel, and those at 4–5 mils were also tested for polymer gel content. The gel content test did not give reliable results for the thicker films, probably because the normal time of toluene soak was inadequate to extract all of the soluble material. The effect of exposure of each PSA to UV light is summarized in Tables 7–10.

TABLE 7

Cure, 180° Peel, and Polymer Gel Contents for A (0.10 wt. % UVI-6974)

| | Temperature during irradiation, °C. | | | | | |
|---|---|---|---|---|---|---|
| | 23 | | 58 | | 93 | |
| Elapsed time after irradiation | 5 min. | 20 hr. | 5 min. | 20 hr. | 5 min. | 20 hr. |
| Adhesive Film tkickness, mil (down) | | | | | | |
| 16–18 | no cure | 5.1 pli, r | | | through cure | 3.7 pli, r |
| 11–12 | | | surface only | 3.5 ph, r | | |
| 7–9 | no cure | 4.1 pli, r | | | through cure | 3.5 pli, r |
| 4–5 | through cure | 5.5 pli, c 63% | | | through cure | 4.5 pli 85% | c means the mode of failure was cohesive, r means ratcheting.

TABLE 8

Cure, 180° Peel, and Polymer Gel Content for B (0.25 wt. % UVI-6974)

| | Temperature during irradiation, °C. | | | | | |
|---|---|---|---|---|---|---|
| | 23 | | 58 | | 93 | |
| Elapsed time after irradiation | 5 min. | 20 hr. | 5 min. | 20 hr. | 5 min. | 20 hr. |
| Adhesive Film tkickness, mil (down) | | | | | | |
| 16–18 | no cure | 3.4 pli, r | | | through cure | 4.0 pli, r |

TABLE 8-continued

Cure, 180° Peel, and Polymer Gel Content for B (0.25 wt. % UVI-6974)

| | Temperature during irradiation, °C. | | | | | |
|---|---|---|---|---|---|---|
| | 23 | | 58 | | 93 | |
| Elapsed time after irradiation | 5 min. | 20 hr. | 5 min. | 20 hr. | 5 min. | 20 hr. |
| 11–12 | | | surface only | 3.5 pli, r | | |
| 7–9 | no cure | 3.7 pli, r | | | through cure | 3.7 pli, r |
| 4–5 | through cure | 6.2 pli, c 73% | | | through cure | 3.2 pli 87% | c means the mode of failure was cohesive, r means ratcheting.

TABLE 9

Cure, 180° Peel, and Polymer Gel Content for C (0.10 wt. % CD-1010)

| | Temperature during irradiation, °C. | | | | | |
|---|---|---|---|---|---|---|
| | 23 | | 58 | | 93 | |
| Elapsed time after irradiation | 5 min. | 20 hr. | 5 min. | 20 hr. | 5 min. | 20 hr. |
| Adhesive Film tkickness, mil (down) | | | | | | |
| 16–18 | no cure | 5.0 pli, r | | | surface cure only | 5.0 pli, r |
| 11–12 | | | surface cure only | 3.7 pli, r | | |
| 7–9 | no cure | 4.0 pli, r | | | through cure | 3.8 pli, r |
| 4–5 | through cure | 6.4 pli, c 62% | | | through cure | 4.8 pli 83% | c means the mode of failure was cohesive, r means ratcheting.

TABLE 10

Cure, 180° Peel, and Polymer Gel Content for D (0.25 wt. % CD-1010)

| | Temperature during irradiation, °C. | | | | | |
|---|---|---|---|---|---|---|
| | 23 | | 58 | | 93 | |
| Elapsed time after irradiation | 5 min. | 20 hr. | 5 min. | 20 hr. | 5 min. | 20 hr. |
| Adhesive Film tkickness, mil (down) | | | | | | |
| 16–18 | no cure | 3.0 pli, r | | | surface cure only | 4.0 pli, r |
| 11–12 | | | surface cure only | 4.3 pli, r | | |
| 7–9 | no cure | 3.9 pli, r | | | through cure | 3.3 pli, r |
| 4–5 | through cure | 5.5 pli, c 74% | | | through cure | 4.6 pli 86% | c means the mode of failure was cohesive, r means ratcheting.

UVI-6974 dispersed to about a particle size of about 0.4 micron in adhesives A and B. CYRACURE UVI-6974 photoinitiator was able to instantly cure films as thick as 16–18 mils as long as the film temperature as 93° C. during irradiation. At lower film temperatures instant cure did not occur, but the dark cure reactions allow cure to develop within 20 hours. The 0.1% level of the UVI-6974 was almost as effective as the 0.25% level. Sartomer's CD-1010 gave similar results.

The inventors hypothesize that one of the reasons, if not the main reason, that thick films can be cured in the present invention is directly due to the fact that the photoinitiator is entirely dispersed instead of being dissolved in the film forming liquid medium, as is the rule with other UV curable compositions. When a photoinitiator is dissolved, the absorption of UV light will be governed by the Beer-Lambert law as described by S. Glasstone and D Lewis, Elements of Physical Chemistry, D. Van Nostrand Co., Princeton N.J., p 658 (1960). This limits the depth of cure.

as discussed by L. R. Gatechair and A. M. Tiefenthaler, Chapter 3 in Radiation Curing of Polymeric Materials, Ed. C E. Hoyle and J. F Kinstle, ACS Symposium Series 417, ACS Washington DC (1990), and S. P. Pappas, Chapter 1 in Radiation Curing Science and Technology, Ed. S. P. Pappas, Topics in Applied Chemistry series, Plenum Press, N.Y. (1992). When the photoinitiator is dispersed, light can penetrate deeply by passing by the dispersed particles in the upper layers of the film and effect cure at much greater depths.

Light transmission though a film normally follows the Beer-Lambert Law, which provides the relationship between the intensity of the transmitted light exiting a film of thickness b (cm) containing a dissolved light absorbing species having a molar absorptivity a (liter-cm/moles) for a given wavelength and having a molar concentration c.

$$\text{Beer-Lambert Law } I = I_0 10^{-abc} \qquad \text{Equation 1}$$

It is often convenient to use the fraction of the incident light that exits the film rather than the actual intensity, in which case the Beer-Lambert Law is expressed as $$I/I_0 = 10^{-abc} \qquad \text{Equation 2}$$

The Beer-Lambert Law is cited extensively in the UV cure literature as governing the absorption of light by the photoinitiator as a function of distance through the film and hence the depth of cure and cure profile in a UV cured film.

$$I_{absorb} = I_0(10^{-axc} - 10^{-ayc}) \text{ or} \qquad \text{Equation 3}$$

$$I_{absorb}/I_0 = 10^{-axc} - 10^{-ayc} \qquad \text{Equation 4}$$

where $I_{absorb}$ is the light absorbed by an incremental layer of the film whose first interface is x cm away from the exposed surface and whose other interface is y cm away.

In the present formulations the inventors have been using Cyracure UVI-6974. The inventors had to resort to dispersing this photoinitiator in the formulations because of lack of solubility in these polymers and formulation ingredients like Regalrez 1085. The dispersion of photoinitiator is relatively uniform, although clearly not monodisperse, and the average particle size is small. The minimum particle size repeatedly seen is about 0.4 microns in diameter. It is not clearly understood at this time whether the dispersed photoinitiator phase consists of solid salt particles or liquid droplets of photoinitiator salt dissolved in its carrier solvent, propylene carbonate. However, it is understood that light penetrating polymeric and formulated films prepared using UVI-6974 as the photoinitiator cannot be generally governed by the Beer-Lambert Law. The particles are big enough to more or less completely absorb all light at highly absorbed wavelengths to shield the area behind them such incoming light, while the particles are few enough in number per unit area to allow most of the light to pass unscathed past them, incremental layer after layer of these particles.

An equation is proposed that should govern the fraction of incident light transmitted through the j-th incremental layer of film:

$$(I/I_0)_j = (I/I_0)_{j-1}|1 - F(I/I_0)_{j-1}| \qquad \text{Equation 5}$$

where F is the fractional area of the j-th incremental layer screened by the dispersed particles in the j-th layer, j-1 is the incremental layer immediately ahead of the j-th layer, and when j=1, $(I/I_0)j-1=(I_0/I_0)=1$. F is a constant, 0<F<1, for a dispersion of particles that is uniform throughout a film, if all incremental layers are of equal thickness. The value of F will depend upon the cross-sectional area of the particles and the number of particles per unit area of the layers. After proposing equation 5 that governs light transmission for UV curable films incorporating an insoluble, dispersed photoinitiator, it was realized that ultra thick films should be curable at modest UV doses.

Example 5

The three pressure sensitive adhesives shown in Table 11 were prepared using the sonication or high shear mixing methods. In fact, sonicated adhesives A and B were made repeatedly over a period of several months and always gave the same results as found here. Polymer 7 is a linear monohydroxy diene polymer having a primary, terminal hydroxyl group. It is similar to Polymers 2, 4, and 5 except that it has a number average molecular weight of 3750 and 0.26 meq of hydroxy functionality per gram.

TABLE 11

| PSA Formulations | | | |
|---|---|---|---|
| | A | B | C |
| Polymer 6 | 24.3 | 24.4 | 24.4 |
| Polymer 7 | 25.3 | 25.4 | 25.4 |
| REGALREZ 1085 | 49.7 | 49.8 | 49.8 |
| UVI-6974 | 0.25 | 0.10 | 0.25 |
| IRGANOX 1010 | 0.15 | 0.15 | 0.15 |

Prior to sonication of batches A and B, all of the ingredients in the batches (40 gram batches were made), including the UVI-6974, were weighed into 2 ounce glass bottles and heated in a 135° C. air oven for 1 hour. Each of the batches was continuously sonicated for one minute at a output setting of 10 and with a output meter reading of about 60, providing a power density of about 5.3 watts per ml. The temperature of these batches should have increased from 135° C. to the usual 150 to 170° C. range normally observed after one minute of sonication. The final temperature measurement was not made.

A 100 gram batch of adhesive C was prepared on the electric-motor driven Silverson high-shear mixer. The batch was heated to 135° C. in an oven and then mixed using the Silverson mixer. The mixer briefly (about 30 seconds) ran at lower speeds until the batch became hotter (less viscous) and more uniform, and then picked up speed. At this point the RPM was measured with a tachometer and was 10,125 RPM. One minute later the speed was found to be 12,330 RPM, at which time the mixing was stopped. The final batch temperature was not measured.

Into 4.7 cm diameter Petri dishes were weighed 2.06 g, 4.12 g, or 8.25 g of each formulation to give approximately 50 mils, 100 mils, or 200 mils of each formulation. The samples were covered, placed in a 93 ° C. oven for 5 to 10 minutes, and then immediately uncovered and Lw cured using a Fussion Lab Processor using one lit "H" bulb. Dose was 250, 500, or 1000 mJ/cm$^2$ as measured with a Lightbug radiometer. The films were immediately inspected for cure (liquid to solid conversion) using a wood split to probe the film.

The uncured PSA batches were examined by optical microscopy using phase contrast at 1260 magnification. All three batches contained a large number of very small particles, with B having less than A. The determination of particle size was done by measuring a few typical photoinitiator particles using a calibrated scale in one of the eye pieces or a calibrated scale on video images that were recorded. Batches A and B had particle sizes of about 0.4 to 0.5 micron diameter, while batch C had particles ranging from less than 0.5 micron up to about 1.0 micron.

The curing results are shown in Table 12.

TABLE 12

Curing very thick PSA's

| | A | B | C |
|---|---|---|---|
| 50 mils: | | | |
| 250 mJ/cm$^2$ | instant through cure | instant through cure | instant through cure |
| 500 mJ/cm$^2$ | instant through cure | instant through cure | — |
| 1000 mJ/cm$^2$ | instant through cure | instant through cure | — |
| 100 mils: | | | |
| 250 mJ/cm$^2$ | instant through cure | instant through cure | instant through cure |
| 500 mJ/cm$^2$ | instant through cure | instant through cure | — |
| 1000 mJ/cm$^2$ | instant through cure | instant through cure | — |
| 200 mils: | | | |
| 250 mJ/cm$^2$ | through cure after 5 minutes | instant through cure | instant through cure |
| 500 mJ/cm$^2$ | instant through cure | instant through cure | — |
| 1000 mJ/cm$^2$ | instant through cure | instant through cure | — |

Clearly seen in Table 12 is the fact that extremely thick films cure easily and quickly at low Uw doses. The results strongly suggest that much thicker films than 200 mils may also be cured, especially with a careful choice of photoinitiator level (less allows deeper light penetration) and light selection (dose and wavelengths). Curing one inch thick sections should be possible.

Example 6

Basic UV curable polymer formulations were prepared using the sonication method. These base formulations could be used for sealants, coatings, laminating adhesives, flexible printing plates, fibers, inks, and a wide variety of films and thin parts. None of the formulations contained any tackifying resin, unlike the previous examples, and the formulations are definitely not PSA's (see Table 13). All photoinitiator additions shown in Table 13 are expressed in terms of the active ingredients. UVR-6110 is a cylcoaliphatic epoxy oligomer supplied by Union Carbide having a density of 1.17 g/cm$^2$. Formulations using it exclusively as the "polymer" are not part of the present invention. It is being used to show what happens when the photoinitiator dissolves in the liquid film forming media. Polymer 8 is hydrogenated butadiene diol polymer having a number average molecular weight of 3530 and having 0.53 meq of hydroxyl functionality per gram. The hydroxyl groups are primary and are terminally located, one on each end of the polymer. The 2,2,4-trimethyl-1,3-pentane diol has an equivalent weight of 73.

TABLE 13

Formulations

| | A | B | C | D |
|---|---|---|---|---|
| CYRACURE ® UVR-6110 | 100 | — | 85.2 | — |
| Polymer 6 | — | 100 | — | 60.2 |
| Polymer 8 | — | — | — | 39.8 |
| 2,2,4-trimethyl-1,3-pentane diol | — | — | 14.8 | — |
| UVI-6974 (active) | 0.25 | 0.25 | 0.25 | 0.25 |

Prior to sonication the 40 gram batches were weighed into 2 ounce glass bottles and preheated to 135° C. in the oven and then hand mixed. Each batch was sonicated continuously for one minute using a output control setting of 10. Batches A and C, using UVR-6110, were sonicated starting at room temperature because they were extremely fluid at room temperature. When sonicated, the power output meter reading was only about 30, indicating that the power density was only about 3 watts per ml. This power density value is of no real interest or concern since the photoinitiator is soluble in the UVI-6110, and using a sonifier is unnecessary. Basically, the sonifier was used because of convenience and for purposes of direct comparison to batches B and D. For batches B and D, the output meter reading was about 60, indicating a power density of about 5.3 watt per ml of formulation.

Into 4.7 cm diameter Petri dishes were weighted 1.03 g, 2.58 g, or 5.15 g of each formulation containing UVR-6110, and 0.82 g, 2.06 g, or 4.12 g of each formulation containing Polymer 6, to give approximately 20 mils, 50 mils, or 100 mils of each formulation, respectively. The samples were covered, and placed in a 93° C. oven for 5 to 10 minutes, uncovered, and immediately UV cured using a Fussion Lab Processor and one "H" bulb. Dose was 250 or 500 mJ/cm$^2$ as measured with a Lightbug. The films were immediately inspected for cure (liquid to solid conversion) using a wood split to probe the film. The films were reinspected at least one day later. Some of the films showing little cure after initial irradiation and aging were re-irradiated at 1000 mJ/cm$^2$, to give a total of 1250 mJ/cm$^2$.

Microscopy and cure results for the PSA films are shown in Table 14. The data summarized in the table is mostly semi-quantitative. Microscopy was carried out using phase contrast and a 1260 magnification. The determination of particle size was done by measuring a few typical particles using the calibrated micrometer scale in one of the eyepieces or examining the video images that were printed. The number and uniformity of the dispersion was determined by looking several in focus layers on a video screen. The description of the curing results in Table 14 uses the following coding. t.surface cure means a thin, uniform cured surface layer that is floating over uncured liquid material wherein the cured thickness is less than about half of the overall film thickness. tk.surface cure means a thick, uniform surface layer is floating on uncured material wherein the cured thickness is greater than half of the overall film thickness. Sometimes a surface film was removed from the liquid underlayer and measured with a micrometer. In these cases the measured film thickness is reported. If no apparent change occurred in the irradiated samples after aging at least 24 hours, this was reported as no change.

TABLE 14

Microscopic Examination and UV Exposure Results

|  |  | A | B | C | D |
|---|---|---|---|---|---|
| Photoinitiator state |  | soluble | dispersed | soluble | dispersed |
| Appearance |  | clear - no particles | many particles, uniform distrib. | clear - no particles | many particles, uniform distrib. |
| Approx. particle size, micron |  | — | 0.4–0.5 | — | 0.4–0.5 |
| *Cure of 20 mil films* | | | | | |
| after 5 min. | 250 mJ/cm$^2$ | 10 mil t. surface | tk. surface | t. surface | through |
| after ≧24 hour |  | no change | through | no change | through |
| after 5 min. | 500 mJ/cm$^2$ | — | through | — | — |
| after 5 min. | 1250 mJ/cm$^2$ | — | — | through | — |
| *Cure of 50 mil films* | | | | | |
| after 5 min. | 250 mJ/cm$^2$ | t. surface | tk. surface | t. surface | through |
| after ≧24 hour |  | no change | almost through | no change | through |
| after 5 min. | 500 mJ/cm$^2$ | — | through | — | — |
| after 5 min. | 1250 mJ/cm$^2$ | — | — | t.surface | — |
| *Cure of 100 mil films* | | | | | |
| after 5 min. | 250 mJ/cm$^2$ | 24 mil t. surface | tk. surface | t. surface | through |
| after ≧24 hour |  | no change | almost through | no change | through |
| after 5 min. | 500 mJ/cm$^2$ | — | through | — | — |
| after 5 min. | 1250 mJ/cm$^2$ | — | — | t. surface | — |

Clearly, when the photoinitiator is dispersed as in formulations B and D, very thick films can be cured quickly at a very reasonable dose, whereas when the photoinitiator is dissolved as in formulations A and C, the depth of cure is much more limited. The results are very consistent with light availability predicted by equations 2 and 5 above.

Example 7

PSA's X, Y, and Z (Table 15) are examples of the present invention. They were also prepared using a simple stirrer. PSA's R and Q are not examples of the invention and were prepared using a Branson 450 Sonifier. Polymer 9 (in Table 15) is an epoxidized linear monohydroxy diene polymer with the structure I-EB—OH, a number average molecular weight is 6070, a 1.6 meq of epoxide functionality per gram, and 1.5 meq/g epoxy. Polymer 4 (in Table 15) is a linear monohydroxy diene polymer with a molecular weight of 3900 and the structure EB—OH containing 0.33 meq/g hydroxyl.

TABLE 15

Pressure Sensitive Adhesives

| PSA | X | Y | Z | R | Q |
|---|---|---|---|---|---|
| Polymer 8 (epoxidized mono-ol) | 99.4 | 99.4 | 99.4 | 99.4 | 99.4 |
| Polymer 9 (mono-ol) | 99.4 | 99.4 | 99.4 | 99.4 | 99.4 |
| Regalite R91 | 198.7 | — | — | 198.7 | — |
| Arkon P90 | — | 198.7 | — | — | 198.7 |
| Regalrez 1085 | — | — | 198.7 | — | — |
| SrCat CD-1012 | 1.0 | 1.0 | 1.0 | — | — |

TABLE 15-continued

Pressure Sensitive Adhesives

| PSA | X | Y | Z | R | Q |
|---|---|---|---|---|---|
| Cyracure UVI-6974* | — | — | — | 2.0 | 2.0 |
| Irganox 1010 | 0.6 | 0.6 | 0.6 | 0.6 | 0.6 |

*UVI-6974 is 50% active. It consists of 50% mixed triarylsulfonium hexflouroantimonate salts and 50% propylene cabonate.

All of the ingredients for adhesives X, Y, and Z, except for the CD-1012 photoinitiator, were weighed into quart cans and each can was heated in a 149° C. oven for about one hour. Each can was removed, hand stirred, and returned to the oven for another ½ hour. Immediately upon final removal from the oven, each partial formulation was mixed with a lab stirrer equipped with an impeller blade until the temperature cooled to about 93° C. This mixing step converts the crude polymers/tackifying resin mixture into a fluid, homogeneous mixture. Half of the required CD-1012 was added and each of the partial formulations was slowly stirred for about 15 minutes until the CD-1012 appeared dissolved. The remainder of the required CD-1012 was added and complete formulations were stirred for an additional 30 minutes while holding the temperature between 88° C. and 99° C. The batches were cooled to room temperature, covered with a lid, and used within one week.

To prepare 400 g batches of adhesives R and Q, the following procedure was followed. A 50 gram 5% wt UVI-6974 photoinitiator master batch in Polymer 9 was prepared by weighing 2.5 g of UVI-6974 and 47.5 g of Polymer 9 into a 4 oz bottle, heating for 30 minutes in a 121°

C. oven, hand mixing, and finally sonicating with a Branson 450 Sonifier for two one minute periods with a cooling time of about 2 minutes between each period. The ingredients for adhesives R and Q, less photointiator and some of Polymer 9, were weighed into quart cans and each can was heated in a 149° C. oven for about one hour. Each can was then removed, hand stirred, and returned to the oven for another ½ hour. After the final removal from the oven, each partial formulation was mixed with a lab stirrer equipped with an impeller blade until the temperature cooled to about 93° C. Then 40 grams of the photoinitiator master match was added and stirring was continued for an additional 30 minutes while holding the batch temperature between 88° C. and 104° C. Upon completion of mixing, each batch was placed in a 121° C. oven to keep the material very fluid. One by one, 50 gram aliquots were poured into 4 oz bottles and sonicated for 1 to 1.5 minutes, and then transferred to a clean can where all of the aliquots for the particular batch were collected. Sonication was carried out using the Branson 450 Sonifier operating in continuous mode, such that power density was approximately 2.8 watts per ml of adhesive. The collected material was remixed with the lab stirrer for 5 minutes. The batches were cooled to room temperature, covered with a lid, and used within one week.

Adhesives X-Z, R, and Q were coated using a ChemInstruments HLCL-1000 hot melt coater and laminator onto AKROSIL SBL80SC Silox FIU/O thermal cure release liner to a thickness of 5 mils. The application temperature required was only 49° C. Samples of each film were warmed for 2 minutes in an oven and then immediately UV cured using an Eye Ultraviolet PL-1 portable benchtop UV curing unit. The UV dose was 180 mJ/cm². The dose was determined by calibration with an EIT UVIMAP hand-held dosimeter supplied by Eye Ultraviolet. After curing, the adhesives were laminated to Pilcher Hamilton 2 mil untreated polyester film and allowed to age at room temperature for 5 to 15 days before testing.

Adhesives X, Y, and Z of the present invention were tested against adhesives R and Q (those requiring sonication to disperse the photoinitiator) and two commercial transfer tapes. The commercial transfer tapes consisted of 5 mil thick adhesive self-wound on release liner. These tapes are believed to be acrylic tapes manufactured by solvent coating the acrylic compositions, drying, and curing. To test the commercial tapes, they were laminated to the 2 mil untreated polyester film. The test results, shown in Table 16, indicate that adhesives X, Y, and Z give properties as good as the adhesives made by the sonication method or as the commercial transfer tape adhesives.

TABLE 16

Comparative Properties

| PSA | X | Y | Z | R | Q | Com. tape 1 | Com. tape 2 |
|---|---|---|---|---|---|---|---|
| Film temperature during irradiation, °C. | 50 | 93 | 93 | 93 | 93 | — | — |
| Polymer gel content, % | 95 | 93 | 84 | 91 | 90 | — | — |
| Loop tack, pli | 6.2 | 5.4 | 5.2 | 6.6 | 5.8 | 3.4 | 2.1 |
| Probe tack, Kg | 1.6 | 1.4 | 1.4 | 1.3 | 1.4 | 1.0 | 1.4 |
| 180° peel from stainless steel | 4.4 | 5.0 | 4.8 | 4.7 | 4.2 | 4.7 | 5.0 |
| 180° peel from glass | 4.5 | 3.9 | 4.2 | 4.4 | 4.1 | 5.3 | 5.7 |
| 180° peel from polymethylmethacrylate | 4.6 | 4.4 | 4.5 | 4.4 | 4.0 | 4.2 | 4.6 |
| 180° peel from polycarbonate | 4.6 | 4.4 | 4.5 | 4.9 | 4.3 | 4.7 | 4.5 |
| 180° peel from high density polyethylene | 1.6 | 1.6 | 2.1 | 2.5 | 2.1 | 0.5 | 0.2 |
| 23° C. holding power to stainless steel, 1 in² * 2 Kg, hour | >112 | >112 | >112 | >112 | >112 | >112 | >112 |
| 95° C. holding power to stainless steel, 1 in² * 500 g, hour | >100 | >100 | >100 | >100 | >100 | >100 | >100 |
| Shear Adhesion Failure Temperature to stainless steel, 1 in² * 500 g, hour | >204 | >204 | >204 | >204 | >204 | >204 | >204 |

We claim:

1. A process, which does not utilize a non-aqueous solvent, for producing a ultraviolet (UV) curable adhesive or sealant composition comprising a monohydroxylated epoxidized polydiene block polymer prepared from at least two polymerizable ethylenically unsaturated hydrocarbon monomers, wherein at least one block having a molecular weight from 100 to 15,000 is prepared from a diene monomer which provides unsaturation suitable for epoxidation, and wherein the polymer contains from 0.1 to 7.0 milliequivalents of epoxy per gram of polymer, and a tackifying resin, said process comprising mixing the epoxidized polymer and the tackifying resin with a photoinitiator which is insoluble in a mixture of the polymer and the tackifying resin under high shear conditions in a high shear mixer at a shear rate of at least 38,000 S⁻¹ or in a sonicator at a power density of at least 4 watts per milliliter.

2. The process of claim 1 wherein the monohydroxylated epoxidized polymer has the formula

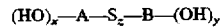

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1.

3. The process of claim 2 wherein the A blocks have a molecular weight of from 100 to 6000 and the B blocks have a molecular weight of from 1000 to 15,000.

4. The process of claim 2 wherein A is isoprene, B is butadiene, and S is styrene.

5. The process of claim 1 wherein the epoxidized monohydroxylated polydiene polymer has the formula

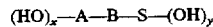

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1.

6. The process of claim 5 wherein the A blocks have a molecular weight of from 100 to 6000 and the B blocks have a molecular weight of from 1000 to 15,000.

7. The process of claim 5 wherein A is isoprene, B is butadiene, and S is styrene.

8. The process of claim 1 wherein the mixing is carried out in a Branson sonicator or a Silverson high shear rotational mixer.

9. A polymer film with a thickness of 5 mils to one inch, said film being formed from the composition made by the process according to claim 1.

* * * * *